3,059,340
ECCENTRICITY AND ALINEMENT GAGE
William E. Fox, 708 W. High, Dowagiac, Mich.
Filed Mar. 17, 1961, Ser. No. 96,584
15 Claims. (Cl. 33—172)

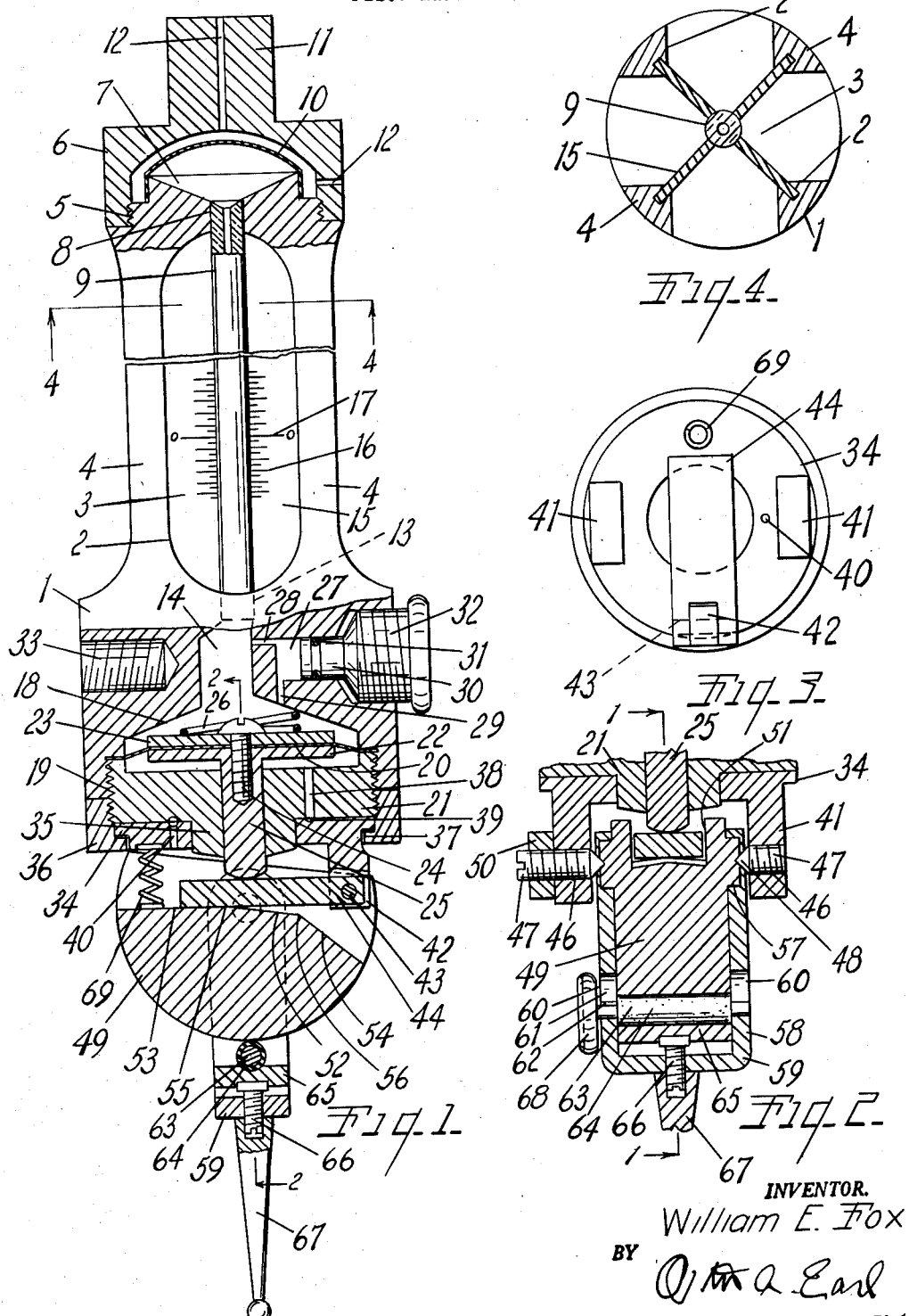
Oct. 23, 1962 — W. E. FOX — 3,059,340
ECCENTRICITY AND ALINEMENT GAGE
Filed March 17, 1961
INVENTOR.
William E. Fox United States Patent Office 3,059,340
Patented Oct. 23, 1962

This invention relates to improvements in eccentricity and alinement gage. The principal objects of this invention are:

First, to provide an eccentricity and alinement gage of the type sometimes referred to as a comparator gage in which extremely small movements of a work contacting member cause relatively large displacements of a column of fluid alongside a calibrated scale for indicating the magnitude of the movements of the work contacting member and in which the column of liquid is visible from various rotated positions of the gage.

Second, to provide a comparator gage of the type described in which movement of the work contacting member to opposite sides of an intermediate position will result in displacement of the sight column liquid in different ratios to provide different degrees of accuracy in the gage.

Third, to provide a comparator gage with a work contacting member that is easily adjustable to various angular positions relative to the gage to contact the work in different position and render the gage operative upon movement of the work in different directions relative to the gage.

Fourth, to provide a novel form of adjustable mounting for the work contacting member of a comparator gage which permits easy adjustment of the contacting member and accurate actuation of the gage in all adjusted positions of the contacting member.

Fifth, to provide a comparator gage in which a moveable work contacting member and a motion transmitting member are easily manufactured and assembled in highly accurate positions relative to a fluid displacement diaphragm so that motion of the work contacting member results in corresponding and accurately proportional displacement of fluid.

Other objects and advantages of the invention will be appreciated from a consideration of the following description and claims. The drawings, of which there is one sheet, illustrate a highly practical form of the gage.

FIG. 1 is a vertical, longitudinal cross sectional view through the assembled gage, the view being taken along the plane of the line 1—1 in FIG. 2.

FIG. 2 is a fragmentary vertical cross sectional view through the work contacting and motion transmitting elements of the gage taken along the plane of the line 2—2 in FIG. 1.

FIG. 3 is a bottom plan view of the mounting member for the motion transmitting elements of the gage.

FIG. 4 is a transverse cross sectional view through the sight tube and measuring scale portion of the gage.

The gage comprises an elongated body 1 desirably made of metal for rigidity and accuracy of machining. Intermediate of its ends, the body 1 is transversely slotted as at 2—2 with the slots intersecting in the center to provide a sight tube opening 3. The slots leave four corner pillars 4 and the upper end of the body is turned and externally threaded as at 5 to receive the cap member 6. The upper end of the body is concavely shaped as at 7 to form an expansion chamber with a hole 8 in the bottom thereof receiving the upper end of a transparent capillary sight tube 9. A flexible diaphragm and dust shield 10 is positioned over the expansion chamber and within the cap 6. The upper end of cap has a stem 11 thereon adapted to be received and clamped in the chuck of a machine tool such as a drill press. Vent passages 12 are provided to permit free flexing of the diaphragm 10.

At the lower ends of the posts 4 and the sight tube opening 3, the sight tube is received in a bore 13 opening eccentrically to a larger bore 14. Indicia plates 15 are mounted in slots in the columns 4 in abutting or closely spaced relation to the sides of the sight tube and the plates are provided with indicia scales 16 arranged in numerically ascending relation on opposite sides of a neutral or zero point 17. The lower end of the body 1 is vertically bored and tapered as at 18 to provide a displacement chamber and a counter bore is internally threaded as at 19 at the lower end of the displacement chamber. A displacement diaphragm 20 of a flexible material is placed over the bottom of the displacement chamber and sealed in place by a plug 21 threaded into the counter bore thread 19. The diaphragm 20 carries a relatively stiff piston 22 secured in place by an upper clamp plate 23 and screw 24 to move the diaphragm as will be described. The piston carries a pin 25 slidably extending through a bore formed in the center of the plug 21. The pin 25, diaphragm 20, chamber 18, tube 9 and a charge of colored liquid in the chamber constitute a motion multiplying means for the visible end of the liquid in the column. A spring 26 positioned in the displacement chamber urges the piston and diaphragm downwardly and it will be apparent that upward displacement of the pin 25 will displace fluid from the displacement chamber through the bore 13 into the sight tube 9. By making the cross sectional area of the displacement chamber at the diaphragm four thousand times the dimension of the passage in the capillary tube very small increments of movement of the pin result in appreciable and easily measured variations in the height of the liquid in the sight tube.

In order to permit initial zeroing of the column of liquid in the sight tube to the zero point 17, a bore 27 in the side of the body 1 communicates with the bore 14 through connecting bores 28 and 29 and receives a small piston 30 with a sealing O-ring 31 therearound. The piston 30 is formed on the end of an adjusting screw 32 threaded into the outer end of the bore 27 so that adjustment of the screw 32 will increase or decrease the effective volume of the displacement chamber 18. A tapped hole 33 on the opposite side of the body from the adjusting screw 32 permits alternative mounting of the gage on a variety of supports and machine tool parts as desired by the machinist. If desired, the gage may be thus supported from its side with the work to be gaged to indicate differences in thickness or elevation of the surface of the work as the work is moved horizontally underneath the guide pin. When this use of the gage is contemplated, the other work contacting element and the mounting means therefor which will be described presently are omitted or removed from the position illustrated.

In order to transmit displacing motion to the pin 25 from a variety of different positions relative to the gage body, a mounting ring 34 is positioned against the bottom of the plug 21 in centered relation around the boss 35 on the plug and retained in place by a retaining ring 36 threaded over the external thread on the plug. The ring 36 has an inwardly projecting retaining flange or shoulder 37 which secures the mounting ring in place. A vent passage 38 through the plug communicates with an annular groove 39 in the top surface of the retaining ring and the vent passage 40 through the mounting ring to prevent pressure from building up underneath the diaphragm 20.

The mounting ring 34 carries depending bearing pin bosses 41 at two diametrically opposite sides thereof and a pivot bearing boss or lug 42 spaced 90° from each of the bearing bosses 41. The pivot pin bearing boss 42 carries a pivot pin 43, the ends of which support an actuator bar 44 extending generally horizontally and diametrically across the mounting ring in contacting relation with the lower end of the pin 25.

The bearing pin bosses 41 define transversely alined tapped apertures 46 receiving the screws 47. The screws have pointed bearing ends 48 which are received in mating conical bearing surfaces in the sides of a semi-cylindrical actuator segment 49. Lock nuts 50 on the pivot screw permit adjustment and locking of the screws in accurate pivot supporting relation to the segment. The upper surface of the segment is slotted in chordal relation as at 51 to receive the actuator bar 44 and the bottom of the slot 51 is provided with a central flat area 52 with angularly cut back or relieved surfaces 53 and 54 at each end thereof to provide abutment edges 55 and 56 engageable with the underside of the actuator bar 44. It will be noted that the abutment edge 55 is closer to the axis of the pivot bearings 48 than the edge 56. Thus a unit rotation of the segment 49 in clockwise direction as viewed in FIG. 1 will raise the actuator bar 44 substantially less than a corresponding clockwise rotation of the segment due to the closer proximity of the edge 56 to the actuator bar pivot 43 and the greater radial distances of the edge 56 from the axis 52. If the distances between the axes of the pivots 43 and 52 is ½ inch and the distance between the edge 56 and the axis 52 is .250 inch while the distance between edge 55 and the axis 52 is .05 inch, the differential of movement reflected on the sight gage will be ten. That is, unit clockwise rotation of the segment as illustrated will result in a .001 reading on the scale 16 while a corresponding and opposite counterclockwise rotation of the segment will result in a .0001 reading on the scale 16.

In order to impart angular or rotary movement to the segment 49 from various positions relative to the gage, the segment is provided with bearing bosses 57 on its sides concentric with the pivot bearings 48 and the bosses rotatably engage and support the arms 58 of a yoke 59 which embraces the semi-cylindrical edge of the segment. Near their outer ends the arms 58 define keyhole passages 60 with enlarged upper openings at 61 and reduced lower bearing openings 62. The enlraged openings 61 permitted the insertion and assembly of a roller 63 through the openings with a sleeve of deformable material such as nylon positioned therearound as at 64. After the sleeve and roller are in position the ends of the roller are rotatably journaled in the lower bearing openings 62. The upper side of the deformable sleeve frictionally engages the periphery of the segment 49 while the lower side of the sleeve rests frictionally and rotatably in a transverse groove formed in a pressure plate 65 positioned in the base of the yoke. The pressure plate 63 is adjustably placed against the sleeve 64 and roller 63 by a flat headed screw 66 passed downwardly through the base of the yoke 59. The lower end of the screw 66 is slotted for adjustment from the outside of the yoke and after the screw has been adjusted to develop the desired retaining friction between the segment 49, roller 63 and yoke 59, the work contacting pointer 67 is threaded over the depending lower end of the screw 66 to simultaneously support the pointer and lock the screw 66 in position. A knurled hand wheel 68 on the end of the roller 63 permits the roller and sleeve to be rotated resulting in angular swinging motion of the pointer 67 to any desired position around the segment 49. The manner of mounting and use of the gage is believed to be obvious to machinists familiar with working with comparator gages.

The actuator segment 49 acts as noted through the bar 44 and pin 25 against the displacement pressure of the diaphragm 20 and the spring 26. Due to the differential lever arms of the abutment edges 55 and 56 the segment moves more easily in a clockwise direction in FIG. 1 than it does in a counter-clockwise direction. In order to equalize the resistance to displacement in both directions, a light spring is positioned between the mounting ring 34 and the top of the segment 49, across the end of the actuator bar 44. As is apparent this spring will increase the resistance to clockwise rotation of the segment and aid in counter-clockwise rotation of the segment thus equalizing the resistance to movement of the work contacting pointer 67.

What is claimed as new is:

1. A comparator gage comprising an elongated body with mounting means on the top and side thereof and defining intersecting transverse slots longitudinally of its mid-section to form a sight tube opening visible from plural rotated positions of the body, a capillary sight tube mounted in said opening and projecting into the end portions of said body, gage indicia marks on said body alongside said tube, a cap secured over the upper end of said body and having one of said mounting means formed on its upper end, a diaphragm secured over the upper end of said sight tube by said cap and forming an expansion chamber communicating with said tube, the lower end of said body having a downwardly opening recess formed therein communicating with the bottom of said tube, said body having a side bore formed therein and communicating with said recess, a zero point adjusting screw threaded into said bore and sealingly engaged with the wall of the bore, a diaphragm disposed across said recess to form a displacement chamber substantially larger in cross section than the cross section of said tube and having a piston mounted on its mid-section, a spring in said displacement chamber urging said diaphragm to chamber enlarging position, a plug threadedly engaged with said body and retaining said diaphragm in place and defining a central guide hole, a pin connected to said piston and projecting through said guide hole to displace said diaphragm, a mounting ring secured against the underside of said plug and having bearing pin bosses depending from opposite sides thereof and a pivot bearing depending therefrom and spaced 90° from said bearing pin bosses, a retaining ring threaded around said plug and securing said mounting ring in place, an actuator bar pivoted on said pivot bearing and projecting across said mounting ring in contacting relation with the bottom of said first pin, a semi-cylindrical actuator segment positioned between said bearing pin bosses and having a slot formed in its upper side receiving said bar, bearing pins threaded through said bearing pin bosses and having pointed ends forming point pivot contacts with said segment, the bottom of said slot having a flat bar contacting surface extending further to one side of said first pin than the other and sloping away from both sides of said surface to form differentially spaced line contacts with said bar, bearing bosses formed on the sides of said segment and centered about said bearing pins, a yoke pivoted on said bosses and embracing said segment, the arms of said yoke defining transversely aligned keyhole slots, an adjusting roller having a deformable sleeve around its center rotatably supported in the smaller ends of said keyhole slots, the larger ends of the slots being large enough to pass said sleeve in assembly, a pressure plate positioned between the arms of said yoke and having a groove in its top side receiving said sleeve, a screw passed through the base of said yoke and pressing said plate and said sleeve into frictional contact with the cylindrical surface of said segment, and a contact pin mounted on said last screw on the bottom of said yoke to swing with the yoke upon adjusting rotation of said roller and to rotate said yoke and said segment upon engagement with work being gaged.

2. A comparator gage comprising an elongated body with mounting means on the top and side thereof and defining intersecting transverse slots longitudinally of its mid-section to form a sight tube opening visible from plural rotated positions of the body, a capillary sight tube mounted in said opening and projecting into the end portions of said body, gage indicia marks on said body alongside said tube, a cap secured over the upper end of said body and having one of said mounting means formed on its upper end, a diaphragm secured over the upper end of said sight tube by said cap and forming an expansion chamber communicating with said tube, the lower end of said body having a downwardly opening recess formed therein communicating with the bottom of said tube, a diaphragm disposed across said recess to form a displacement chamber substantially larger in cross section than the cross section of said tube and having a piston mounted on its mid-section, a spring in said displacement chamber urging said diaphragm to chamber enlarging position, a plug threadedly engaged with said body and retaining said diaphragm in place and defining a central guide hole, a pin projecting through said guide hole to displace said diaphragm.

a mounting ring secured against the underside of said plug and having bearing pin bosses depending from opposite sides thereof and a pivot bearing depending therefrom and spaced 90° from said bearing pin bosses, an actuator bar pivoted on said pivot bearing and projecting across said mounting ring in contacting relation with the bottom of said first pin, a semi-cylindrical actuator segment positioned between said bearing pin bosses and having a slot formed in its upper side receiving said bar, bearing pins threaded through said bearing pin bosses and forming point pivot contacts with said segment, the bottom of said slot having a flat bar contacting surface extending further to one side of said guide pin than the other and sloping away from both sides of said surface to form differentially spaced line contacts with said bar, bearing bosses formed on the sides of said segment and centered about said bearing pins, a yoke pivoted on said bosses and embracing said segment, the arms of said yoke defining transversely aligned keyhole slots, an adjusting roller having a deformable sleeve around its center rotatably supported in the smaller ends of said keyhole slots, the larger ends of the slots being large enough to pass said sleeve in assembly, a pressure plate positioned between the arms of said yoke and having a groove in its top side receiving the sleeve, a screw passed through the base of said yoke and pressing said block and said sleeve into frictional contact with the cylindrical surface of said segment, and a contact pin mounted on the bottom of said yoke to swing with the yoke upon adjusting rotation of said roller and to rotate said yoke and said segment upon engagement with work being gaged.

3. A comparator gage comprising an elongated body with mounting means thereon and defining a sight tube opening visible from plural sides of the body, a capillary sight tube mounted in said opening and projecting into the end portions of said body, gage indicia marks on said body alongside said tube, means secured over the upper end of said sight tube forming an expansion chamber communicating with said tube, the lower end of said body having a downwardly opening recess formed therein communicating with the bottom of said tube, said body having a side bore formed therein and communicating with said recess, a zero point adjusting screw threaded into said bore and sealingly engaged with the wall of the bore, a diaphragm disposed across said recess to form a displacement chamber substantially larger in cross section than the cross section of said tube and having a piston mounted on its mid-section, a spring in said displacement chamber urging said diaphragm to chamber enlarging position, means retaining said diaphragm in place and defining central guide hole below the diaphragm, a pin connected to said piston and projecting through said guide hole to displace said diaphragm, means on the bottom of said body forming bearing pin bosses depending from opposite sides of the body and a pivot bearing depending from said body at a point off-set from bearing pin bosses, an actuator bar pivoted on said pivot bearing and projecting in contacting relation with the bottom of said first pin, a semi-cylindrical actuator segment positioned between said bearing pin bosses and having a slot formed in its upper side receiving said bar, bearing pins threaded through said bearing pin bosses and having pointed ends forming point pivot contacts with said segment, the bottom of said slot having differentially spaced line contacts with said bar relative to the axis of said bearing pins, a yoke pivoted about the axis of said pins and embracing said segment, an adjusting roller having a deformable sleeve around its center rotatably supported in the arms of said yoke, means providing frictional contact between said roller and the cylindrical surface of said segment and said yoke, and a contact pin mounted on the bottom of said yoke to swing with the yoke upon adjusting rotation of said roller and to rotate said yoke and said segment upon engagement with work being gaged.

4. A comparator gage comprising an elongated body with mounting means thereon and defining a sight tube opening visible from plural sides of the body, a capillary sight tube mounted in said opening and projecting into the end portions of said body, gage indicia marks on said body alongside said tube, means forming an expansion chamber communicating with said tube, the lower end of said body having a downwardly opening recess formed therein communicating with the bottom of said tube, said body having a side bore formed therein and communicating with said recess, a zero point adjusting screw threaded into said bore and sealingly engaged with the wall of the bore, a diaphragm disposed across said recess to form a displacement chamber substantially larger in cross section than the cross section of said tube and having a piston mounted on its mid-section, means urging said diaphragm to chamber enlarging position, means defining a central guide hole below the diaphragm, a pin connected to said piston and projecting through said guide hole to displace said diaphragm, means on the bottom of said body forming bearing pin bosses depending from opposite sides of the body and a pivot bearing depending from said body at a point off-set from bearing pin bosses, an actuator bar pivoted on said pivot bearing and projecting in contacting relation with the bottom of said first pin, an actuator member positioned between said bearing pin bosses and having a slot formed in its upper side receiving said bar, bearing pins threaded through said bearing pin bosses forming pivot contacts with said actuator member, the bottom of said slot having differentially spaced contacts with said bar relative to the axis of said bearing pins, a yoke pivoted about the axis of said pins and embracing said actuating member, a contact pin mounted on the bottom of said yoke to swing with the yoke upon adjusting rotation of said roller and to rotate said yoke and said actuating member upon engagement with work being gaged, and a spring compressed between said means on the bottom of said body and said actuator member at a point off-set from said bearing pins on the opposite side of the bearing pins from the pivot bearing of said actuator bar, the greater of said differentially spaced contacts between said bar and said actuator member being located between said pin and said pivot bearing.

5. A comparator gage comprising an elongated body with mounting means thereon and defining a sight tube opening visible from plural sides of the body, a sight tube mounted in said opening and projecting into the end portions of said body, gage indicia marks on said body alongside said tube, the lower end of the said body having a recess formed therein communicating with the bottom of said tube, a diaphragm disposed across said recess to form a displacement chamber substantially larger in cross section than the cross section of said tube and having a piston mounted on its mid-section, a pin arranged to displace said diaphragm, bearing bosses depending from opposite sides of said body and a pivot bearing depending from the body and spaced from said bearing bosses, an actuator bar pivoted on said pivot bearing and projecting in contacting relation with the bottom of said first pin, an actuator member positioned between said bearing bosses and having a slot formed in its upper side receiving said bar, bearing pins carried by said bearing bosses and forming pivot contacts with said actuating member, a bottom of said bar and the top of said actuating member being shaped to provide differentially spaced contacts on opposite sides of the axis of said bearing pins, and a work contacting pin adjustably connected to said actuating member.

6. A comparator gage comprising an elongated body with mounting means thereon and defining a sight tube opening visible from plural sides of the body, a sight tube mounted in said opening and projecting into the end portions of said body, gage indicia marks on said body alongside said tube, the lower end of said body having a recess formed therein communicating with the bottom of said tube, a diaphragm disposed across said recess to form a displacement chamber substantially larger in cross section than the cross section of said tube and having a piston mounted on its mid-section, a pin arranged to displace said diaphragm, bearing bosses depending from opposite sides of said body and a pivot bearing depending from the body and spaced from said bearing bosses, an actuator bar pivoted on said pivot bearing and projecting in contacting relation with the bottom of said first pin, an actuator member positioned between said bearing bosses and below said bar, bearing pins carried by said bearing bosses and forming pivot contacts with said actuating member, the bottom of said bar and the top of said actuating member being shaped to provide differentially spaced contacts on opposite sides of the axis of said bearing pins, and a work contacting pin connected to said actuating member.

7. A comparator gage comprising a body with mounting means thereon, movement multiplying means mounted in said body with visible indicating means at the end having the greater movement, gage indicia marks on said body alongside said indicating means, a pin mounted in said body and connected to actuate said multiplying means, a mounting ring secured against the underside of said body and having bearing bosses depending from opposite sides thereof and a pivot bearing depending therefrom and spaced from said bearing bosses, an actuator bar pivoted on said pivot bearing and projecting across said mounting ring in contacting relation with the bottom of said pin, a semi-cylindrical actuator segment positioned between said bearing bosses and having an upper side extending chordally of its arc in opposed relation of said bar, bearing pins threaded through said bearing bosses and having pointed ends forming point pivot contacts with said segment, said chordally extending upper side having a flat bar contacting surface extending further to one side of said actuating pin than the other and sloping away from both sides of said surface to form differentially spaced line contacts with said bar on opposite sides of said actuating pin, bearing bosses formed on the sides of said segment and centered about said bearing pins, a yoke pivoted on said bosses and embracing said segment, the arms of said yoke defining transversely aligned keyhole slots, an adjusting roller having a deformable sleeve around its center rotatably supported in the smaller ends of said keyhole slots, the larger ends of the slots being large enough to pass said sleeve in assembly, a pressure plate positioned between the arms of said yoke and having a groove in its top side receiving said sleeve, a screw passed through the base of said yoke and pressing said plate and said sleeve into frictional contact with the cylindrical surface of said segment, and a contact pin mounted on said last screw on the bottom of said yoke to swing with the yoke upon adjusting rotation of said roller and to rotate said yoke and said segment upon engagement with work being gaged.

8. A comparator gage comprising a body with mounting means thereon, movement multiplying means mounted in said body with visible indicating means at the end having the greater movement, gage indicia marks on said body alongside said indicating means, a pin mounted in said body and connected to actuate said multiplying means, said body having bearing bosses depending from opposite sides thereof and a pivot bearing depending therefrom and spaced from said bearing bosses, an actuator bar pivoted on said pivot bearing and projecting in contacting relation with the bottom of said pin, a semi-cylindrical actuator segment positioned between said bearing bosses and having a chordal upper side arranged to contact said bar, bearing pins threaded through said bearing bosses and having ends forming pivot contacts with said segment along an axis lying in said chordal side, said chordal side having differentially spaced lines contacts with said bar on opposite sides of said first pin, a yoke pivoted about said bearing pins and embracing said segment, an adjusting roller having a deformable sleeve around its center rotatably supported in the arms of said yoke, a pressure plate positioned between the arms of said yoke and having a groove in its top side receiving said sleeve, means pressing said plate and said sleeve into frictional contact with the cylindrical surface of said segment, and a contact pin mounted on the bottom of said yoke to swing with the yoke upon adjusting rotation of said roller and to rotate said yoke and said segment upon engagement with work being gaged.

9. A comparator gage comprising a body with mounting means thereon, movement multiplying means mounted in said body with visible indicating means at the end thereof having the greater movement, gage indicia marks on said body alongside said indicating means, a driving member for said multiplying means projecting from the bottom of said body, a mounting ring removably mounted on the underside of said body and having bearing bosses depending from opposite sides thereof and a pivot bearing depending therefrom and spaced from said bearing bosses, an actuator bar pivoted on said pivot bearing and projecting across said mounting ring in contacting relation with the bottom of said driving member, a semi-cylindrical actuator segment positioned between said bearing pin bosses and below said bar, bearing pins carried by said bearing bosses and forming pivot contacts with said segment, the bottom of said bar and the top of said actuator segment having contacting surfaces positioned on opposite sides of said pivot pins and further to one side of said pivot pins than the other to form differentially spaced contacts with said bar, bearing bosses formed on the sides said segment and centered about said bearing pins, a yoke pivoted on said bosses and embracing said segment, an adjusting roller having a deformable sleeve around its center rotatably supported in the arms of said yoke, means pressing said roller into frictional contact with the cylindrical surface of said segment, and a contact pin mounted on the bottom of said yoke to swing with the yoke upon adjusting rotation of said roller and to rotate said yoke and said segment upon engagement with work being gaged.

10. A comparator gage comprising a body with mounting means thereon, movement multiplying means mounted in said body with visible indicating means at the end thereof having the greater movement, gage indicia marks on said body alongside said indicating means, a driving member for said multiplying means projecting from the underside of said body, the underside of said body having bearing bosses depending from opposite sides thereof and a pivot bearing depending therefrom and spaced from said bearing bosses, an actuator bar pivoted on said pivot bearing and projecting in contacting relation with the bottom of said driving member, a semi-cylindrical actuator segment positioned between said bearing pin bosses and below said bar, bearing pins carried by said bearing bosses and forming pivot contacts with said segment, a yoke pivoted about said bearing pins and embracing said segment, an adjusting roller having a deformable sleeve around its center rotatably supported in the arms of said yoke, means pressing said roller into frictional contact with the cylindrical surface of said segment, and a contact pin mounted on the bottom of said yoke to swing with the yoke upon adjusting rotation of said roller and to rotate said yoke and said segment upon engagement with work being gaged.

11. In a hydraulic comparator gage having a capillary sight tube communicating with a displacement chamber and a diaphragm positioned to displace fluid from the chamber into the tube, a pin mounted to displace said diaphragm and having an exposed end, an actuator bar extending in contacting relation with said end and having a pivot fixed relative to said pin, an actuating member pivoted on fixed axis transverse to said bar and having its upper side opposed to the bar, the opposed faces of said bar and said actuating member being shaped to provide bar contact points between the bar and actuating member spaced at different distances from the pivot axis of the actuating member, and a work contacting pin angularly adjustably mounted on said actuating member.

12. In a hydraulic comparator gage having a capillary sight tube communicating with a displacement chamber and a diaphragm positioned to displace fluid from the chamber into the tube, a pin mounted to displace said diaphragm and having an exposed end, an actuator bar extending in contacting relation with said end and having a pivot fixed relative to said pin, an actuating member pivoted on a fixed axis transverse to said bar and having a slot in its upper side embracing said bar with the bottom of the slot opposed to the bar, a straight central area on the bottom of said slot extending to different distances on opposite sides of the pivot axis of said actuating member, the bottom of the slot being cut back from each end of said straight area to provide bar contact points between the bar and actuating member spaced at different distances from the pivot axis of the actuating member, and a work contacting pin angularly adjustably mounted on said actuating member by being pivoted about the same axis as said actuating member and having a deformable holding element frictionally and rollingly engaged between said contacting pin and an arcuate surface on said actuating member.

13. In a hydraulic comparator gage having a displacement chamber and a diaphragm positioned to displace fluid from the chamber, a capillary sight tube having one end in pressure transmitting relation to said chamber, a pin mounted to displace said diaphragm and having an exposed end, an actuator bar extending in contacting relation with said end and having a pivot fixed relative to said pin and remote therefrom, an actuating member pivoted on a fixed axis transverse to said bar and having a surface opposed to the bar, a straight central area on said surface extending to different distances on opposite sides of the pivot axis of said actuating member, said surface being cut back from each end of said straight area to provide contact points between the bar and actuating members spaced at different distances from the pivot axis of the actuating member and on opposite sides of said axis with the shorter distance on the opposite side of said axis from the pivot of said bar, a work contacting pin angularly adjustably mounted on said actuating member by being pivoted about the same axis as said actuating member and having a deformable holding element frictionally and rollingly engaged between said contacting pin and an arcuate surface on said actuating member, said contact points being arranged so that a line therebetween intersects said axis of said actuating member, and a spring acting between said actuating member and a fixed portion of said gage to oppose movement of the shorter spaced contact point into displacing relation to said bar.

14. In a hydraulic comparator gage having a capillary sight tube communicating with a displacement chamber and a diaphragm positioned to displace fluid from the chamber into the tube, a pin mounted to displace said diaphragm and having an exposed end, an actuator bar extending in contacting relation with said end and having a pivot fixed relative to said pin, an actuating member pivoted on a fixed axis transverse to said bar and having a slot in its upper side embracing said bar with the bottom of the slot opposed to the bar, the bottom of said slot and said bar being cut to provide bar contact points between the bar and actuating member spaced at different distances from the pivot axis of the actuating member, and a work contacting pin angularly adjustably mounted on said actuating member by being pivoted about the same axis as said actuating member and having a holding element frictionally and rollingly engaged between said contacting pin and an arcuate surface on said actuating member.

15. In a hydraulic comparator gage having a displacement chamber and a diaphragm positioned to displace fluid from the chamber, a capillary sight tube having one end in pressure transmitting relation to said chamber, a pin mounted to displace said diaphragm and having an exposed end, an actuator bar extending in contacting relation with said end and having a pivot fixed relative to said pin and remote therefrom, an actuating member pivoted on a fixed axis transverse to said bar and having a surface opposed to the bar, the opposed portions of said surface and said bar being cut to provide contact points between the bar and actuating member spaced at different distances from the pivot axis of the actuating member and on opposite sides of said axis with the shorter distance on the opposite side of said axis from said pivot of said bar, and a work contacting pin angularly adjustably mounted on said actuating member by being pivoted about the same axis as said actuating member and having a holding element frictionally and rollingly engaged between said contacting pin and an arcuate surface on said actuating member.

References Cited in the file of this patent

UNITED STATES PATENTS 2,814,124    Blake    Nov. 26, 1957

FOREIGN PATENTS 152,440    Sweden    Nov. 22, 1955